US005583741A

United States Patent [19]

Dosmo et al.

[11] Patent Number: 5,583,741

[45] Date of Patent: Dec. 10, 1996

[54] SWITCH

[75] Inventors: Renato Dosmo; Giovanni Mairati, both of Bergamo, Italy

[73] Assignee: ABB Sace Spa, Bergamo, Italy

[21] Appl. No.: 230,911

[22] Filed: Apr. 21, 1994

[30] Foreign Application Priority Data

Apr. 21, 1993 [IT] Italy .................................. MI93A0788
Apr. 21, 1993 [IT] Italy .................................. MI93A0786

[51] Int. Cl.[6] ........................................ H02B 1/26

[52] U.S. Cl. ........................................ 361/600; 361/622

[58] Field of Search .................................. 200/18, 50 R, 200/50 A; 361/622, 627, 628, 631, 632, 634–636, 724–727, 728, 609, 837, 600

[56] References Cited

U.S. PATENT DOCUMENTS

| | | | |
|---|---|---|---|
| 2,579,168 | 12/1951 | Ballou | 200/50 R |
| 2,713,104 | 7/1955 | Johnson, Jr. et al. | 200/18 X |
| 3,179,761 | 4/1965 | Malota et al. | 200/50 A |
| 4,249,227 | 2/1981 | Kato et al. | 361/622 |
| 4,305,114 | 12/1981 | Takagi et al. | 361/609 X |
| 4,774,629 | 9/1988 | Stanfield et al. | 361/627 |
| 4,992,909 | 2/1991 | Rutenbeck | 439/65 |
| 5,010,445 | 4/1991 | Weinold | 361/728 |
| 5,196,658 | 3/1993 | Gula | 200/50 R |

*Primary Examiner*—J. R. Scott
*Attorney, Agent, or Firm*—Burns, Doane, Swecker & Mathis

[57] ABSTRACT

The switch (1) includes a box-shaped housing body which can be installed in a switch cabinet. A switching lever (5) and an additional device (4) are arranged on the front of the housing body, which lever and device can be passed outwards through a door of the switch cabinet.

On the front, the housing body has a flat bearing surface (6) of defined size from which the switching lever (5) projects. The additional device (4) has a flat rear which corresponds with the bearing surface (6) and with an opening (3) in the switch cabinet door. Fastening means are furthermore provided, with whose aid the additional device (4, 19, 22, 25, 27, 30) or a further additional device (19, 22, 25, 27, 30), which can be replaced thereby, can be fixed on the bearing surface (6).

10 Claims, 5 Drawing Sheets

SWITCH

BACKGROUND OF THE INVENTION

1. Field of the Invention

The invention is based on a switch having a box-shaped housing body which can be installed in a switch cabinet and on whose front there are arranged a switching lever and an additional device, which lever and device can be passed outwards through a door of the switch cabinet.

2. Discussion of Background

If such a switch is installed in a switch cabinet, at least two openings are normally provided in a wall, which is preferably constructed as a door, of the switch cabinet, of which openings one is used for passing the switching lever through, which is required for operating the switch contacts, and another is used for passing the additional device through, such as a display device, for example. The switch can then be operated and monitored without it being necessary to open the switch cabinet door. Additional devices are in general of different sizes and, in addition, frequently have differently constructed fastening devices. In consequence, their mounting in the switch is often exacerbated and, in addition, the openings which are provided in the switch cabinet door differ from one another in terms of their shape and their dimensions.

SUMMARY OF THE INVENTION

Accordingly, one object of the invention is to provide a novel switch of the type mentioned initially which can be equipped in a simple and quick manner with any desired additional device without the switch cabinet accommodating the switch needing to have a specially dimensioned opening which is used for the additional device to pass through.

The switch according to the invention is distinguished by the fact that a defined bearing surface is fixed on its front, which bearing surface is advantageously bounded by the sides of a rectangle. As a result of this and as a result of the fact that the additional devices have a bearing surface on their rear, which bearing surface corresponds with the bearing surface of the switch and is likewise advantageously bounded by one side of the rectangle, any desired additional devices can be mounted, operated, monitored, serviced and replaced on the switch without it being necessary to open the switch cabinet door and without it being necessary to provide openings of different size in the switch cabinet door.

For reliable, simple and quick installation, it is of major importance that fastening means are provided having at least one insertion opening, which is passed from the edge of the bearing surface of the switch into the housing body of the switch, and having a fastening tab which projects outwards from the edge of the bearing surface of each of the additional devices and can be inserted into the insertion opening, to form a hinge.

If a plurality of switches are installed in the switch cabinet, openings having the same dimensions and the same shape are now incorporated in the switch cabinet door instead of a plurality of openings having different dimensions, the dimensions of the openings which are now provided corresponding with the dimensions of the bearing surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
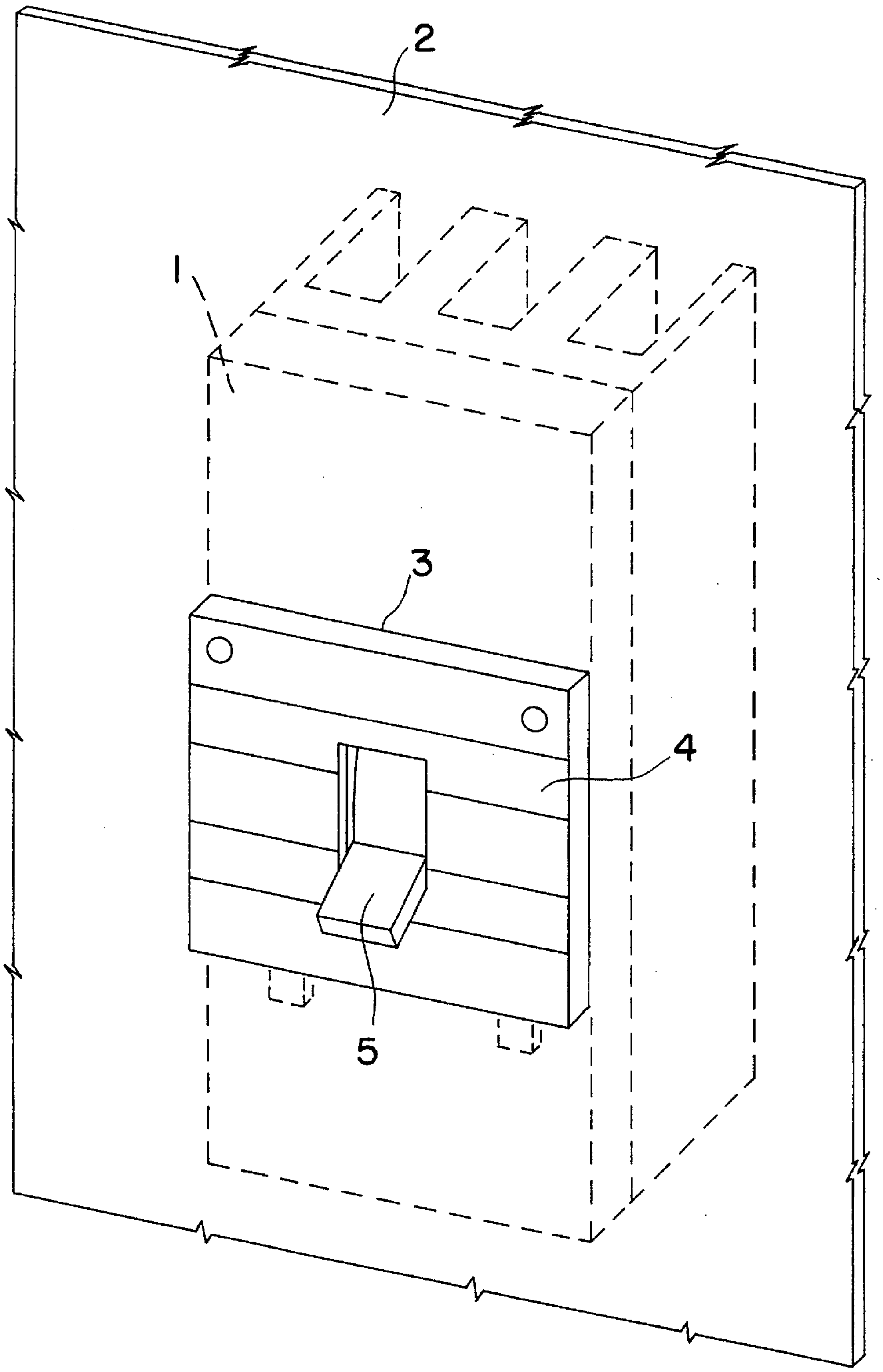
FIG. 1 is a perspective view of a switch according to an embodiment of the present invention.

Referring now to the drawings, wherein like reference numerals designate identical or corresponding parts throughout the several views, FIG. 1 shows an embodiment of a switch 1 according to the invention, which is mounted in the interior of a switch cabinet whose front is closed by means of a door 2. The switch cabinet door 2 has an opening 3 through which an additional device 4, which is constructed as a cover, together with a switching lever 5, which can pivot vertically, project for operating a contact device of the switch 1.

Figure 2F:
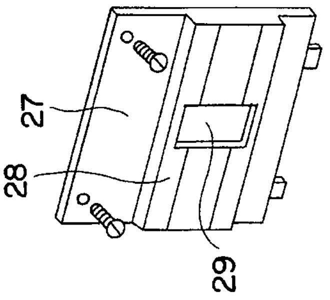
FIG. 2A is a perspective view of a housing body and FIGS. 2B–2F are different additional devices for use in combination with the housing body of FIG. 2A according to embodiments of the present invention.
Figure 2E:
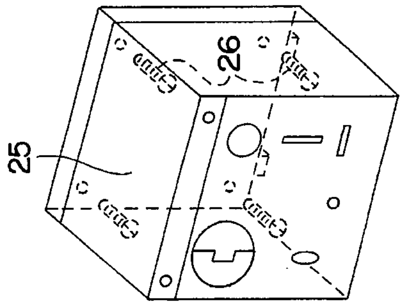
Figure 2A:
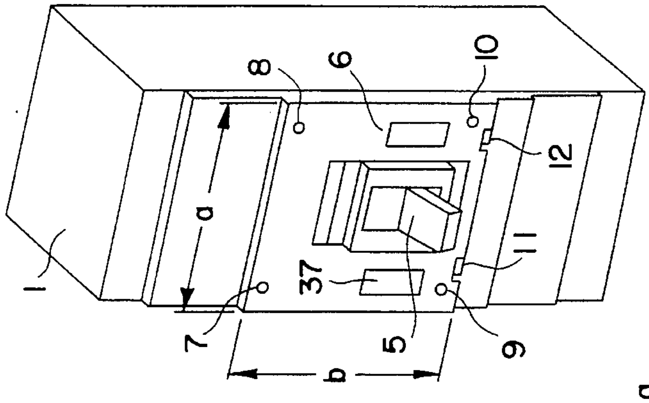
Figure 2D:
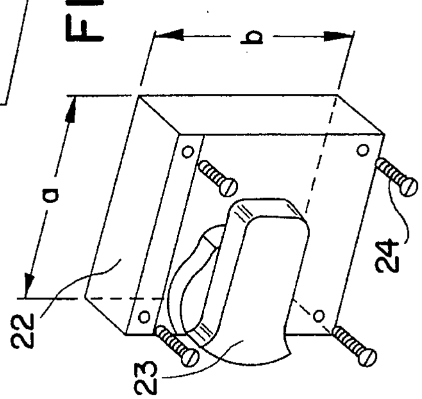
Figure 2B:
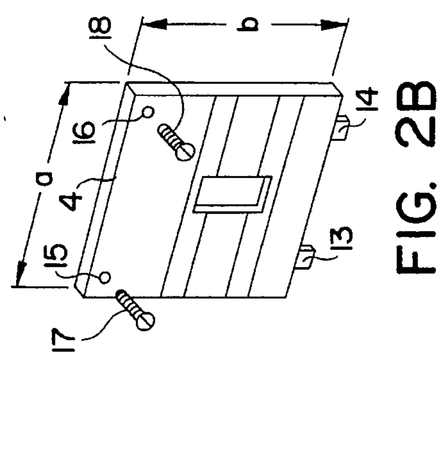

FIG. 2A shows the schematically illustrated housing body of the switch 1 after removal of the cover 4, shown in FIG. 2B. The switching lever 5, which projects out of the front of the switch 1, is passed through a bearing surface 6 of the switch 1. The bearing surface 6 is bounded by the sides a and b of a rectangle. As can be seen in FIG. 2A, threaded holes 7 and 8, as well as 9 and 10 respectively, are provided on two parallel sides which bound the bearing surface 6 of the switch. Openings 11 and 12 are provided on one of these two sides, which openings are in the form of slots and enable the insertion of fastening tabs 13 and 14 of the additional device 4, which is constructed as a cover, and hence a positively locking connection of the additional device and of the switch 1. The fastening tabs 13 and 14 project on one side of the cover 4, as can be seen.

Once the fastening tabs 13 and 14 have been inserted into the openings 11 and 12, the cover 4 can be pivoted like a hinge onto the bearing surface 6 of the switch. After completion of the pivoting process, the threaded holes 7 and 8, which are provided in the bearing surface 6, are aligned with unthreaded holes 15 and 16 in the cover 4. The cover 4 can now be fastened by means of two bolts 17 and 18, which can be passed through the unthreaded holes 15 and 16 and can be fixed in the threaded holes 7 and 8.

Figure 2C:
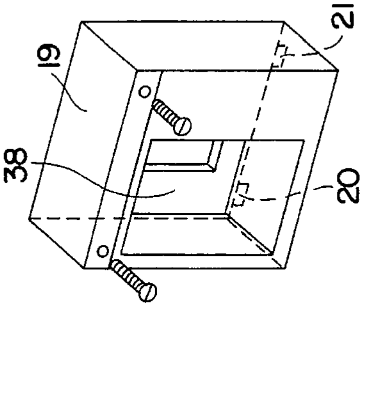

FIG. 2C moreover shows an additional device 19 having a space 38 which is dimensioned to be sufficiently large to be able to accommodate and operate the switching lever 5, which can pivot upwards from the bottom and vice versa. The switching lever 5 can be locked with the aid of a lever, which can be inserted through openings which are not shown in the side walls of the additional device 19 transversely with respect to the pivoting range of the switching lever 5, and can be locked in the locking position with the aid of lockable padlocks. This additional device 19, with its special structure, can also be fastened using fastening tabs 20 and 21 and with the assistance of bolts which are screwed into the threaded holes 7 and 8 in the housing body of the switch 1.

Furthermore, an additional device 22 can be seen in FIG. 2D, which additional device 22 has an operating device 23 which is constructed as a rotatable lever with a switch knob and makes it possible to act on the switching lever 5 of the switch 1, using a rotary movement. The housing body of the additional device 22, which is severely stressed during the operation of the lever, is fixed by means of four bolts 24 which are inserted into the threaded holes 7, 8, 9 and 10. This ensures that the additional device 22 is supported particularly firmly on the surface 6 of the switch 1.

FIG 2E shown an additional device 25 which can be fastened on the bearing surface 6 by means of bolts 26. The additional device 25 includes a transmission which is driven by a motor and acts on the switching lever 5.

FIG. 2F shows an additional device 27 which is constructed as a cover and has a horizontally running thickened region 28. This thickened region forms a particularly robust bushing for the switching lever 5, which is passed out of the housing body of the switch through an opening 29 in the cover 27.

Figure 3:
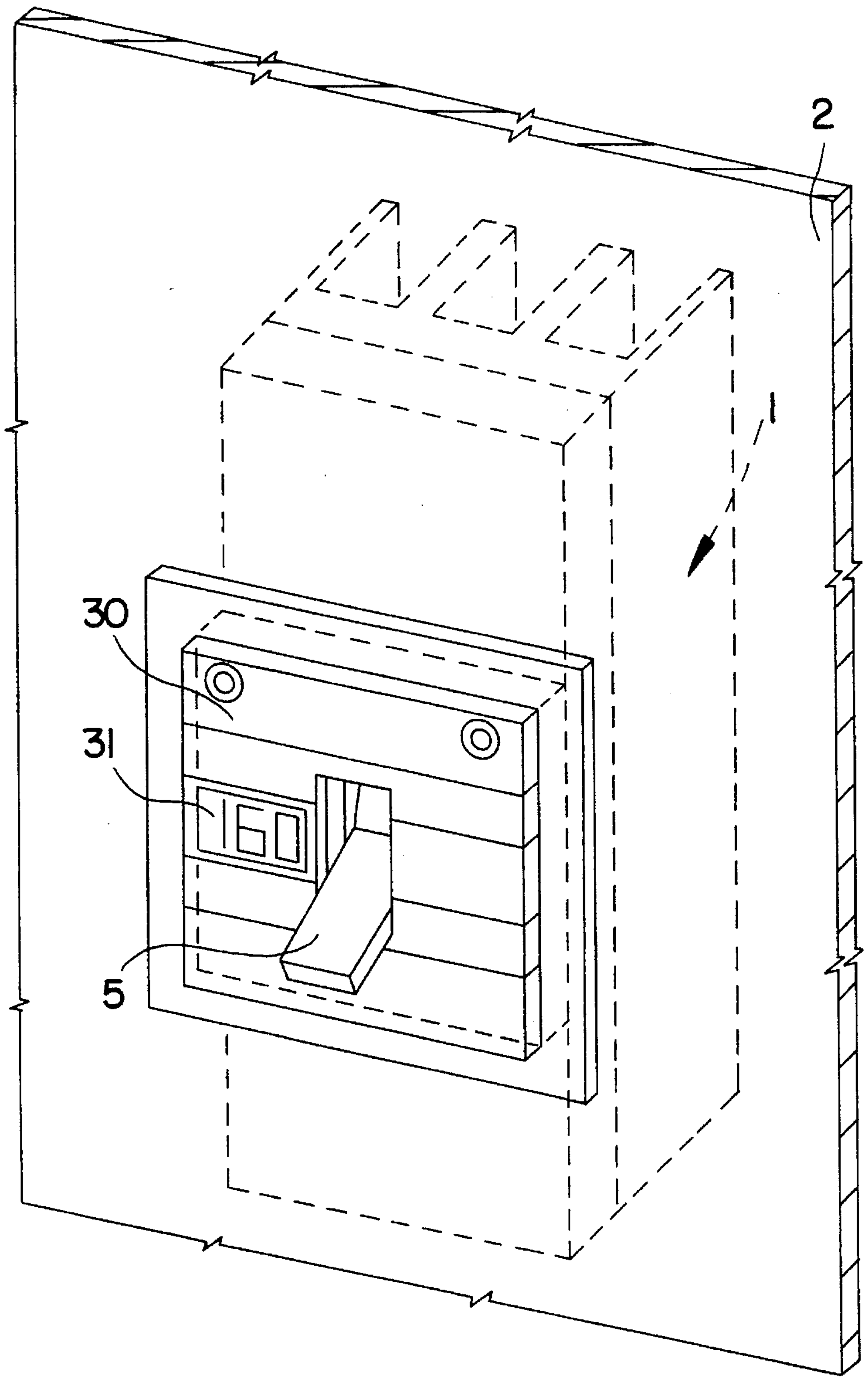
FIG. 3 is a perspective view of a switch according to an embodiment of the present invention.

FIG. 3 shows an embodiment of the switch 1, in the case of which embodiment an additional device 30, which is constructed as a cover, projects out of the switch cabinet door 2. The cover 30 has an opening, which is not shown, through which the switching lever 5 of the switch is passed. An additional device is fastened to the cover 30, is constructed as an ammeter, and has a digital display device 31 which continuously shows the value of the current flowing through one phase conductor of the switching apparatus 1. The display device 31 is preferably able to display at least three digits. As can be seen from FIG. 4, the display device 31 can also display the measurement unit —A can be seen for current as the measured variable.

Figure 4:
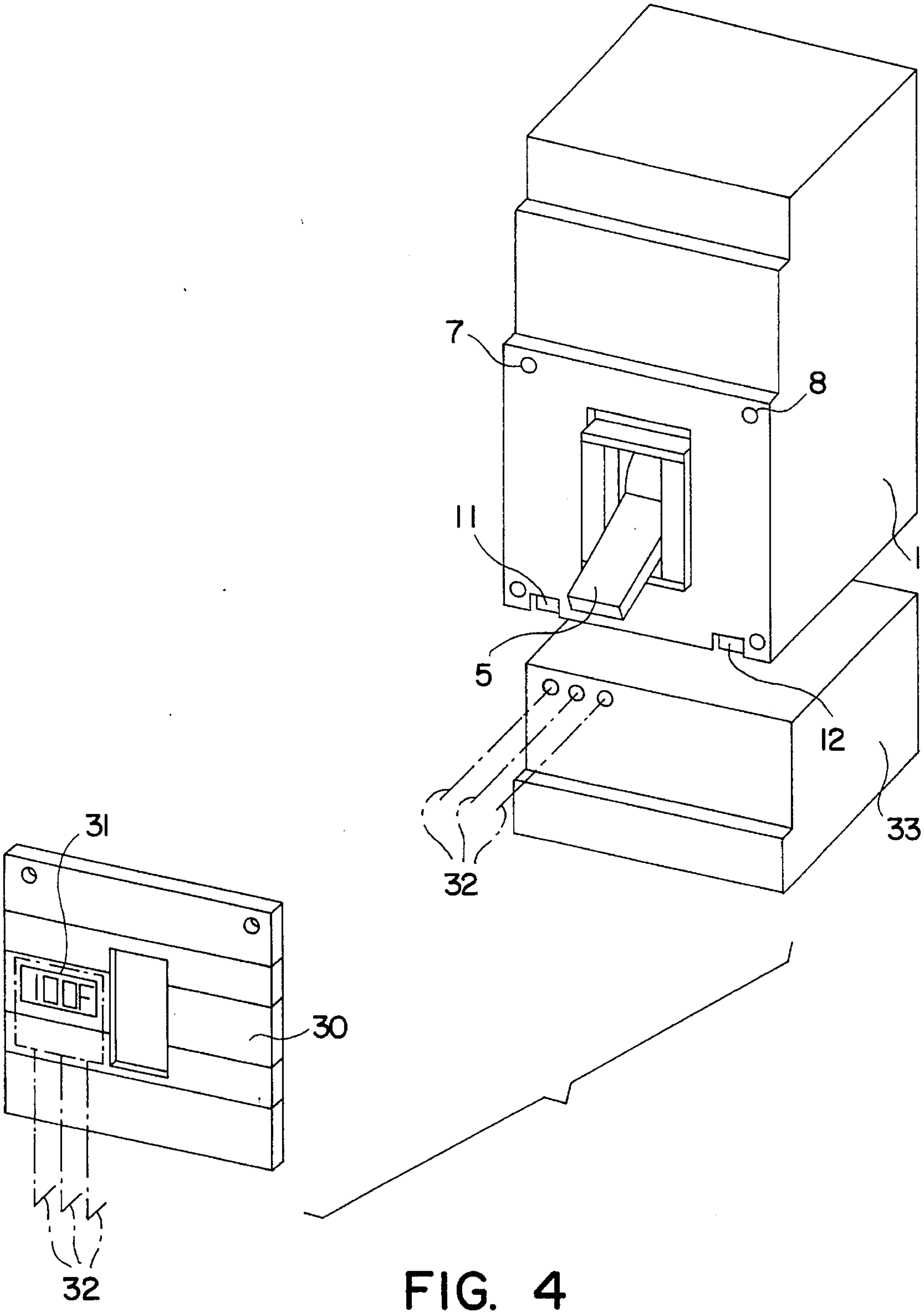
FIG. 4 is a perspective, partially exploded view of the switch of FIG. 3.

As can be seen in FIG. 4, the ammeter is connected via plug-in wires 32 to an additional device, which is constructed as a protection unit 33, of the switching apparatus 1. The protection unit 33 has an auxiliary circuit which cannot be seen in FIG. 4 and is supplied with current via a connecting part, which can likewise not be seen in FIG. 4. Some of the wires 32 are connected, for example, by plugging, in DC terms to live wires of the connecting part and are used for supplying power to an auxiliary circuit of the ammeter. More of the wires 32 are connected via a plug connection to a data bus, which can be seen in FIG. 5, of the protection unit 33.

Figure 5:
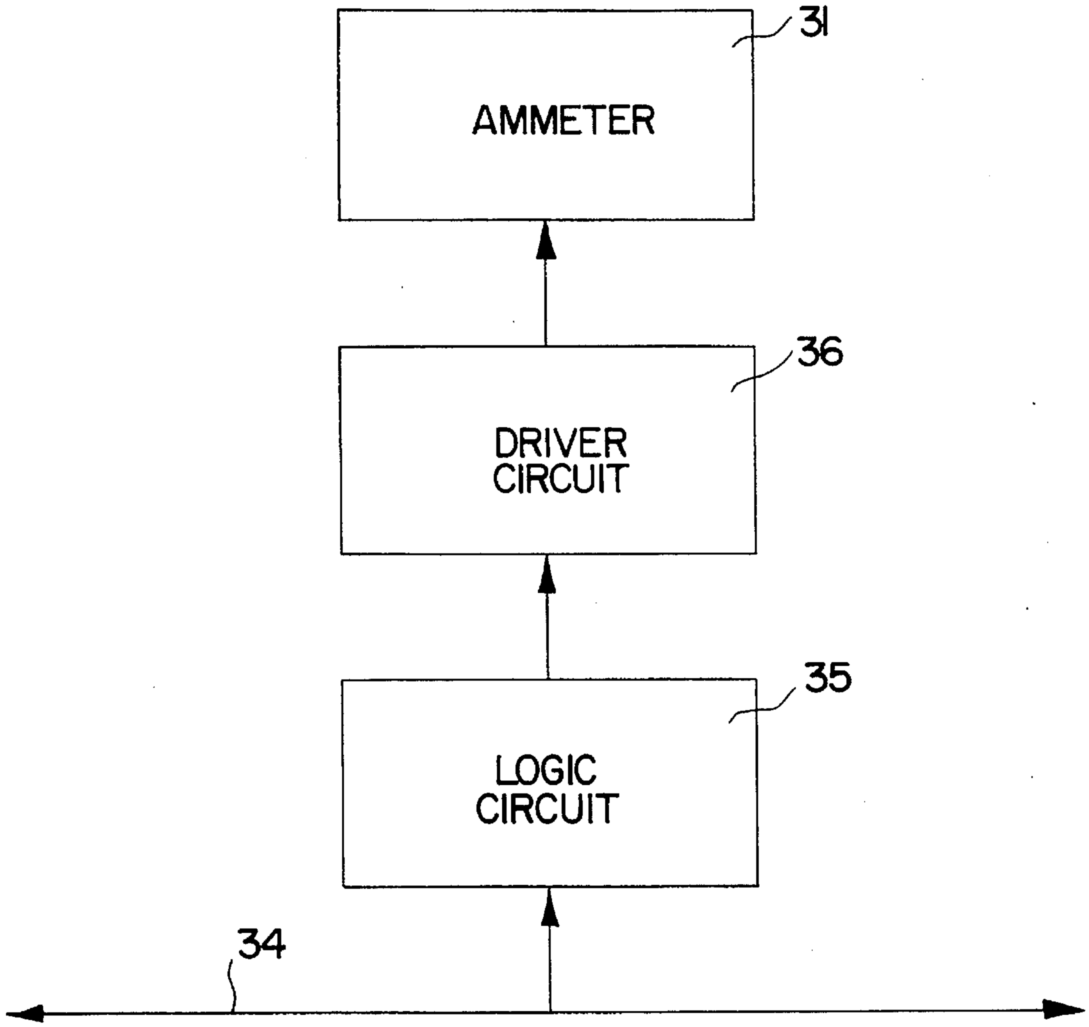
FIG. 5 is a block diagram illustrating a circuit for an ammeter on an additional device in a switch according to an embodiment of the present invention.

This data bus, which is provided with the number 34 in FIG. 5, carries information items relating to the current flowing in the switching apparatus 1. These information items can be present both in analog form and in digitally coded form. The data bus 34 is connected to a logic circuit 35 which is arranged on the cover 30 and is able to code information items which are present in the bus 34 and to process them such that they are suitable for reproduction on the display device 31. The logic circuit 35 acts on the display device 31 via a driver circuit 36.

The ammeter shown is installed completely in the cover 30 and can be supplied, as described, with supply current and measurement signals. The current can be read even when the switching apparatus 1 is installed in the switch cabinet and the door 2 is closed, without any additional openings having to be produced.

Obviously, numerous modifications and variations of the present invention are possible in light of the above teachings. It is therefore to be understood that within the scope of the appended claims, the invention may be practiced otherwise than as specifically described herein.

What is claimed is:

1. A switch assembly for installation in a switch cabinet, the switch cabinet having an opening, the switch assembly comprising:

a box-shaped housing body, the housing body having a front side adapted to extend through the opening in the switch cabinet, the front side of the housing body having a flat bearing surface;

a switch having a switching lever, the switch being disposed in the housing body such that the switching lever extends past the from side of the housing body;

an additional device, the additional device having a wall including a flat rear surface corresponding to the flat bearing surface; and means for removably attaching the additional device to the housing body such that the flat rear surface is disposed adjacent the flat bearing surface, wherein the switching lever extends through an opening in the wall of the additional device, and the removable attaching means are disposed on the switch assembly such that the removable attaching means are accessible when the switch assembly is installed in a switch cabinet.

2. The switch assembly as set forth in claim 1, wherein the additional device is in the form of a cover and includes an ammeter having a display device mounted on the additional device, the switch including a conductor, the ammeter being arranged to detect and the display device displaying current in the conductor.

3. The switch assembly as set forth in claim 2, wherein the additional device includes a protection device connected to the ammeter.

4. The switch assembly as set forth in claim 2, wherein the additional device includes a data bus for carrying information relating to power flowing through the switch.

5. The switch assembly as set forth in claim 4, wherein the data bus is connected to a logic circuit for coding information from the bus and processing the information for display on the display device.

6. The switch assembly as set forth in claim 1, wherein the removable attaching means includes hinge components on the housing body and the additional device.

7. The switch assembly as set forth in claim 1, wherein the removable attaching means includes bolts for removably securing the additional device to the housing body.

8. The switch assembly as set forth in claim 1, wherein the flat bearing surface is rectangular.

9. The switch assembly as set forth in claim 1, wherein the additional device includes a rotatable lever and means for transmitting rotational movement of the lever to linear movement to drive the switching lever.

10. The switch assembly as set forth in claim 1, wherein the additional device includes means, drivable by a motor, for driving the switching lever.

* * * * *